(12) United States Patent
Dietz

(10) Patent No.: US 8,178,052 B2
(45) Date of Patent: May 15, 2012

(54) REPOSITIONABLE MOUNTING MATERIAL, POLLUTION CONTROL DEVICE, AND METHODS OF MAKING THE SAME

(75) Inventor: Peter T. Dietz, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 344 days.

(21) Appl. No.: 12/663,613

(22) PCT Filed: Apr. 28, 2008

(86) PCT No.: PCT/US2008/061746
§ 371 (c)(1),
(2), (4) Date: Dec. 8, 2009

(87) PCT Pub. No.: WO2008/156918
PCT Pub. Date: Dec. 24, 2008

(65) Prior Publication Data
US 2010/0166619 A1    Jul. 1, 2010

Related U.S. Application Data

(60) Provisional application No. 60/943,674, filed on Jun. 13, 2007.

(51) Int. Cl.
*B29C 65/00* (2006.01)
*B32B 9/00* (2006.01)
(52) U.S. Cl. .................. 422/179; 156/289; 428/41.8
(58) Field of Classification Search .............. 422/177, 422/179, 180; 428/14.8, 323; 156/289, 313
See application file for complete search history.

(56) References Cited

U.S. PATENT DOCUMENTS

| 3,001,571 A | 9/1961 | Hatch |
| RE27,747 E | 9/1973 | Johnson |
| 3,795,524 A | 3/1974 | Sowman |
| 3,857,731 A | 12/1974 | Merrill, Jr. et al. |

(Continued)

FOREIGN PATENT DOCUMENTS

DE    3514150 C1    4/1986

(Continued)

OTHER PUBLICATIONS

Bowen, P., "Particle Size Distribution Measurement from Millimeters to Nanometers and From Rods to Platelets," Journal of Dispersion Science and Technology, New York, NY, vol. 23, No. 5, Jan. 1, 2002, pp. 631-662.

(Continued)

*Primary Examiner* — Tom Duong
(74) *Attorney, Agent, or Firm* — Bradford B. Wright

(57) ABSTRACT

A repositionable mounting material comprises a mounting material having a major surface and comprising inorganic fibers. A layer of repositionable pressure-sensitive adhesive inwardly disposed along at least a portion of the first major surface. The layer of repositionable pressure-sensitive adhesive comprises: adhesive microspheres having a first particle size distribution with at least one mode, each of which has a D50 of at least 30 micrometers; and binder particles having a second particle size distribution with at least one mode, wherein each mode has a D50 that is less than 10 micrometers, and wherein at least one of the at least one modes has a D50 below one micrometer. The repositionable mounting material is useful in manufacture of pollution control devices. Methods of making the foregoing are also disclosed.

38 Claims, 2 Drawing Sheets

U.S. PATENT DOCUMENTS

| | | | |
|---|---|---|---|
| 3,916,057 A | 10/1975 | Hatch et al. | |
| 4,047,965 A | 9/1977 | Karst et al. | |
| 4,305,992 A | 12/1981 | Langer et al. | |
| 4,521,333 A | 6/1985 | Graham et al. | |
| 4,786,696 A | 11/1988 | Bohnel | |
| 4,999,168 A | 3/1991 | Ten Eyck | |
| 5,045,569 A | 9/1991 | Delgado | |
| 5,118,750 A | 6/1992 | Silver et al. | |
| 5,571,617 A | 11/1996 | Cooprider et al. | |
| 5,696,199 A | 12/1997 | Senkus et al. | |
| 5,714,237 A | 2/1998 | Cooprider et al. | |
| 5,736,109 A | 4/1998 | Howorth et al. | |
| 5,756,625 A | 5/1998 | Crandall et al. | |
| 5,824,748 A | 10/1998 | Kesti et al. | |
| 5,853,675 A | 12/1998 | Howorth | |
| 5,882,608 A | 3/1999 | Sanocki et al. | |
| 5,924,917 A * | 7/1999 | Benedict et al. | 451/526 |
| 5,952,420 A | 9/1999 | Senkus et al. | |
| 6,245,301 B1 | 6/2001 | Stroom et al. | |
| 6,306,497 B1 | 10/2001 | Wang | |
| 6,759,015 B2 | 7/2004 | Peisert | |
| 2003/0109630 A1 | 6/2003 | Smith et al. | |
| 2005/0232828 A1 | 10/2005 | Merry | |
| 2006/0154040 A1 | 7/2006 | Merry | |
| 2006/0286014 A1 | 12/2006 | Peisert et al. | |

FOREIGN PATENT DOCUMENTS

| | | |
|---|---|---|
| WO | WO 00/11098 A1 | 2/2000 |
| WO | WO 2005/105427 A1 | 11/2005 |
| WO | WO 2006/065534 A1 | 6/2006 |
| WO | WO 2007/143437 A2 | 12/2007 |

OTHER PUBLICATIONS

PCT International Search Report Written Opinion of the International Searching Authority, PCT/US2008/061746, mailing date Aug. 18, 2008, 13 pp.

Co-pending U.S. Appl. No. 12/663,613, entitled "Repositionable Mounting Material, Pollution Control Device, and Methods of Making the Same," 371(c) date Dec. 8, 2009.

Co-pending U.S. Appl. No. 12/663,720, entitled "Securable Mounting Material and Method of Making and Using the Same," transmitted Dec. 9, 2009.

* cited by examiner

REPOSITIONABLE MOUNTING MATERIAL, POLLUTION CONTROL DEVICE, AND METHODS OF MAKING THE SAME

CROSS-REFERENCE TO RELATED APPLICATIONS

This application is a national stage filing under 35 U.S.C. §371 of PCT/US2008/061746, filed Apr. 28, 2008, which claims priority to U.S. Provisional Application No. 60/943,674, filed Jun. 13, 2007, the disclosure of which is incorporated by reference in its/their entirety herein.

BACKGROUND

Pollution control devices are employed on motor vehicles to control atmospheric pollution. Two types of such devices, catalytic converters and diesel particulate filters or traps, are currently in widespread use. Catalytic converters contain a catalyst, which is typically coated onto a monolithic structure mounted in the converter. The monolithic structures (termed "monoliths") are typically ceramic, although metal monoliths have been used. The catalyst oxidizes carbon monoxide and hydrocarbons, and reduces the oxides of nitrogen in automobile exhaust gases to control atmospheric pollution. Diesel particulate filters or traps are generally wall flow filters which have honeycombed monolithic structures (also termed "monoliths"), typically made from porous crystalline ceramic material.

Typically, as constructed, each type of these devices has a metal housing which holds within it a monolithic structure or element that can be metal or ceramic, and is most commonly ceramic. The ceramic monolith generally has very thin walls to provide a large amount of surface area and is fragile and susceptible to breakage. Moreover, there is a current industry trend regarding ceramic monoliths used in automotive catalytic converters toward monoliths having smoother outer surfaces that makes it more difficult to maintain adhesion of the mounting mat to the ceramic monolith during canning. Ceramic monoliths also typically have coefficients of thermal expansion that are an order of magnitude less than typical metal housings (for example, stainless steel housings) in which they would be contained in use. To avoid damage to the ceramic monolith from road shock and vibration, to compensate for the thermal expansion difference, and to prevent exhaust gases from passing between the monolith and the metal housing, ceramic mat or intumescent sheet materials are often disposed between the ceramic monolith and the metal housing.

The process of placing or inserting the ceramic monolith and mounting material within the metal housing is also referred to as "canning", and includes such processes as wrapping a mounting mat such as, for example, an intumescent sheet or ceramic mat around the monolith and inserting the wrapped monolith into the housing.

Prior to canning a monolith, the mounting material is typically wrapped about the monolith and secured in place. In some cases, the mounting mat is secured to the monolith by an adhesive layer or adhesive tape sandwiched between the mounting mat and the monolith. For example, PCT Pat. Appl. Publ WO 00/11098 A1 (Peisert et al.) discloses a mounting mat having an adhesive layer on a material layer, which adhesive may be a repositionable adhesive such as a microsphere adhesive.

SUMMARY

In one aspect, the present invention provides a repositionable mounting material comprising:

a mounting material having first and second opposed major surfaces and comprising inorganic fibers; and a layer of repositionable pressure-sensitive adhesive inwardly disposed along at least a portion of the first major surface, wherein the layer of repositionable pressure-sensitive adhesive comprises:

adhesive microspheres having a first particle size distribution with at least one first mode, each of which has a D50 of at least 30 micrometers; and binder particles, wherein the repositionable mounting material is repositionably adherable to a monolith adapted for use in a pollution control device, and wherein a reference mounting material, prepared identically to the repositionable mounting material, except without the binder particles, is not repositionably adherable to the monolith.

In certain embodiments, the binder particles have a second particle size distribution with at least one second mode, each of which has a D50 that is less than 10 micrometers, and wherein at least one of the at least one second modes has a D50 below one micrometer. In certain embodiments, the layer of repositionable pressure-sensitive adhesive further comprises dispersant particles having a third size distribution with at least one third mode, each of which has a D50 of greater than one micrometer and less than 30 micrometers, and wherein on a volume basis, the adhesive microspheres and dispersant particles are present in a respective ratio of at least 95:5. In certain embodiments, on a weight basis, the adhesive microspheres comprise from 15 to 80 percent of the total weight of the adhesive microspheres, binder particles, and dispersant particles combined.

In certain embodiments, the repositionable mounting material further comprises a liner releasably adhered to the layer of repositionable pressure-sensitive adhesive.

In another aspect, the present invention provides a method of making a repositionable mounting material, the method comprising:

providing a mounting material having first and second major surfaces and comprising bonded inorganic fibers; and applying a dryable composition to at least a portion of the major surface of the mounting material, wherein the dryable composition comprises:

adhesive microspheres having a first particle size distribution with at least one first mode, each of which has a D50 of at least 30 micrometers; and binder particles; and at least partially drying the dryable composition to provide a layer of repositionable pressure-sensitive adhesive inwardly disposed along at least a portion of the first major surface, wherein the repositionable mounting material is repositionably adherable to a monolith adapted for use in a pollution control device, and wherein a reference mounting material, prepared identically to the repositionable mounting material, except without the binder particles, is not repositionably adherable to the monolith.

In certain embodiments, the dryable composition further comprises dispersant particles having a third size distribution with at least one third mode, each of which has a D50 of greater than one micrometer and less than 30 micrometers, and wherein on a volume basis, the adhesive microspheres and dispersant particles are present in a respective ratio of at least 95:5. In certain of these embodiments, on a weight basis, the adhesive microspheres comprise from 15 to 80 percent of the total weight of the adhesive microspheres, binder particles, and dispersant particles combined.

In yet another aspect, the present invention provides a method of making a repositionable mounting material, the method comprising:
   providing a mounting material having a major surface and comprising bonded inorganic fibers; and
   applying a first dryable composition to at least a portion of the major surface of the mounting material, wherein the first dryable composition comprises adhesive microspheres having a first particle size distribution with at least one mode, each of which has a D50 of at least 30 micrometers;
   applying a second dryable composition comprising binder particles to at least a portion of the major surface of the mounting material; and
   at least partially drying the first and second dryable compositions to provide a layer of repositionable pressure-sensitive adhesive inwardly disposed along at least a portion of the first major surface, wherein the repositionable mounting material is repositionably adherable to a monolith adapted for use in a pollution control device.

In certain embodiments, the second dryable composition is applied to at least a portion of the first major surface before the first dryable composition.

In certain embodiments, the first dryable composition further comprises dispersant particles having a third size distribution with at least one third mode, each of which has a D50 of greater than one micrometer and less than 30 micrometers, and wherein on a volume basis, the adhesive microspheres and dispersant particles are present in a respective ratio of at least 95:5. In certain of these embodiments, on a weight basis, the adhesive microspheres comprise from 15 to 80 percent of the total weight of the adhesive microspheres, binder particles, and dispersant particles combined.

In certain embodiments, methods according to the present invention further comprise releasably adhering a liner to the layer of repositionable pressure-sensitive adhesive.

In certain embodiments, repositionable mounting material according to the present invention is adapted for use in a pollution control device. Accordingly, in yet another aspect, the present invention provides a pollution control device comprising: a housing; a pollution control element disposed within the housing; and a repositionable mounting material according to the present invention disposed adjacent to, or within, the housing. In certain embodiments, the mounting material is disposed between the pollution control element and the housing.

In yet another aspect, the present invention provides a method of making a pollution control device, the method comprising: disposing a repositionable mounting material according to the present invention adjacent to, or within, a housing having a pollution control element disposed within the housing. In certain embodiments, the method further comprises disposing a repositionable mounting material according to the present invention adjacent to, or within, a housing having a pollution control element disposed within the housing.

In certain embodiments, at least a portion of the inorganic fibers are bonded together by a binder. In certain of those embodiments, the binder comprises organic material.

In certain embodiments, the mounting material further comprises an unexpanded intumescent material. In certain of those embodiments, the unexpanded intumescent material comprises vermiculite, graphite, or a combination thereof. In certain embodiments, the mounting material has a dry basis weight of from 0.4 to 15 kilograms per square meter. In certain embodiments, the inorganic fibers comprise ceramic fibers. In certain embodiments, the mounting material has a maximum tensile strength that is less than 400 kPa.

In certain embodiments, each of the at least one first modes of the first particle size distribution has a D50 of at least 45 micrometers. In certain embodiments, each of the at least one second modes of the second particle size distribution has a D50 in a range of from 0.05 to 0.3 micrometer. In certain embodiments, on average, the binder particles are situated father from to the major surface than the adhesive microspheres.

Repositionable mounting materials according to the present invention are useful, for example, for canning a monolith, and/or for use as end cone insulation in a pollution control device.

It is presently discovered that whereas conventional repositionable microsphere adhesives may result (as shown in the Examples hereinbelow) in failure of the mounting material if repositioned, repositionable mounting materials prepared according to the present disclosure are repositionably adherable to a monolith (for example, a smooth ceramic monolith) adapted for use in a pollution control device without damaging the repositionable mounting material or objectionable adhesive transfer to the monolith.

As used herein:
   the term "mode" as applied to a particle size distribution refers to that component of the particle size distribution that is responsible for a local maximum particle size;
   the term "pressure-sensitive adhesive" or "PSA" refers to a viscoelastic material that possesses the following properties: (1) aggressive and permanent tack, (2) adherence with no more than finger pressure, (3) sufficient ability to hold onto an substrate, and (4) sufficient cohesive strength to be removed cleanly from the substrate;
   the term "D10" as applied to a particle size distribution refers to that particle diameter wherein 10 percent by volume of the particles in the distribution have a smaller particle diameter;
   the term "D50" as applied to a particle size distribution refers to that particle diameter wherein 50 percent by volume of the particles in the distribution have a smaller particle diameter;
   the term "D90" as applied to a particle size distribution refers to that particle diameter wherein 90 percent by volume of the particles in the distribution have a smaller particle diameter;
   the term "pressure-sensitive microsphere adhesive" refers to pressure-sensitive adhesive consisting essentially of generally micrometer-sized polymeric spheres;
   the term "repositionably adherable" as applied to an article means the article is capable of being repeatedly adhered to a substrate, removed, and re-adhered to the substrate without substantial damage to the article or the substrate or resulting in adhesive transfer.

In this application, all numerical ranges in the specification and claims are to be considered as inclusive of their end points, unless otherwise indicated. Further, unless otherwise noted, all parts, percentages, and ratios in the specification and claims are on a weight basis.

DETAILED DESCRIPTION

Figure 1:
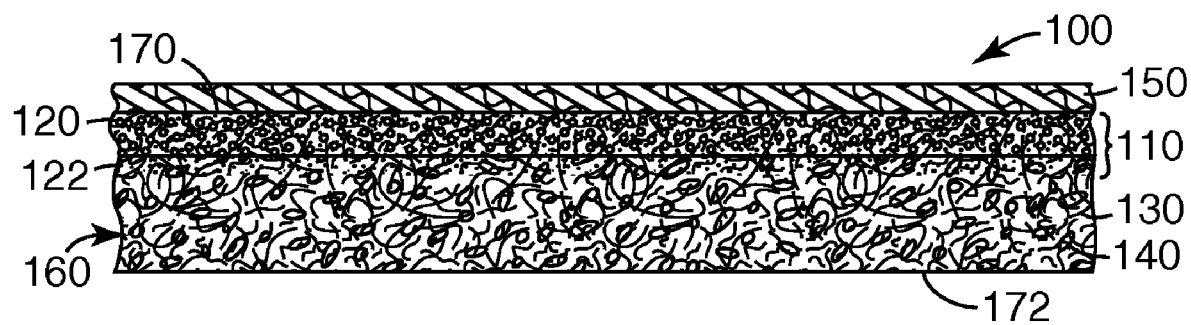
FIG. 1 is a schematic side view of an exemplary repositionable mounting material according to one embodiment of the present invention.

Referring now to FIG. 1, an exemplary repositionable mounting material 100 comprises a mounting material 160 having first and second major surfaces 170, 172. Mounting material 160 comprises inorganic fibers 130, optional intumescent filler 140, and optional binder 145 (not shown). If present, optional binder 145 is distributed throughout mounting material 160 and strengthens the mounting material 160 by binding the various components of mounting material 160 together. Layer of repositionable pressure-sensitive adhesive 110, which does not extend throughout the thickness of mounting material 160, is inwardly disposed along at least a portion of first major surface 170, but does not extend through mounting material 160 to second major surface 172. Layer of repositionable pressure-sensitive adhesive 110 comprises adhesive microspheres 120 and binder particles 122. Adhesive microspheres 120 have a particle size distribution with at least one mode, each of which has a D50 of at least 30 micrometers. Binder particles 122 have a second particle size distribution with at least one mode, wherein each mode has a D50 that is less than 10 micrometers, and wherein at least one of the at least one modes has a D50 below one micrometer. Repositionable mounting material 100 is repositionably adherable to a monolith (for example, a cordierite monolith) adapted for use in a pollution control device.

Figure 2:
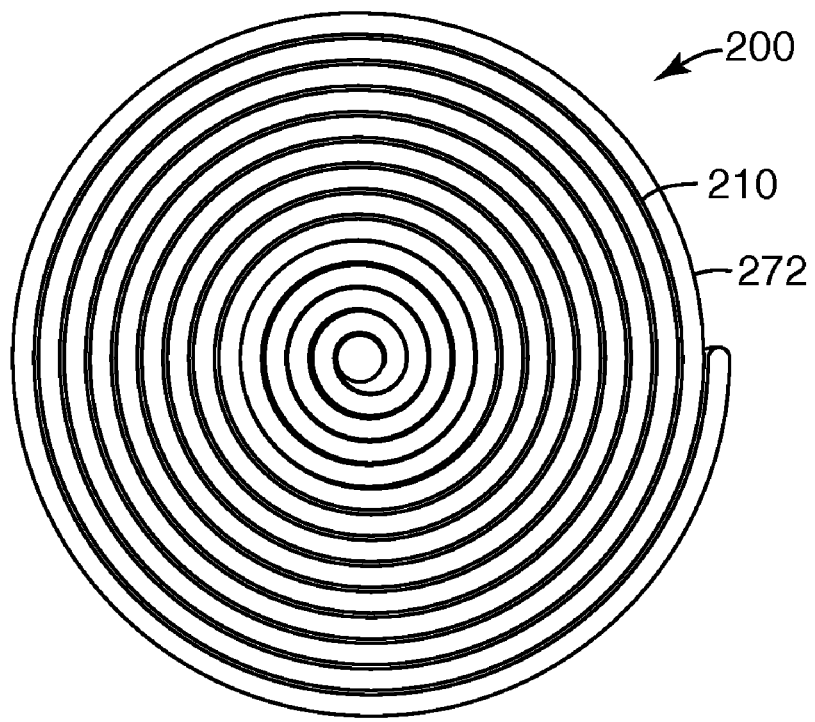
FIG. 2 is a schematic side view of an exemplary repositionable mounting material according to one embodiment of the present invention.

As shown, layer of repositionable pressure-sensitive adhesive 110 is releasably adhered to optional release liner 150. Alternatively, as shown in FIG. 2, an exemplary repositionable mounting material 200 may be provided as a roll with layer of repositionable pressure-sensitive adhesive 210 releasably adhered to second major surface 272. Stacks of repositionable mounting material are also encompassed by the present invention.

Surprisingly, it is discovered according to the present invention that inclusion of a layer of repositionable pressure-sensitive adhesive including both adhesive microspheres 120 and a binder particles 122 reduces or eliminates damage to repositionable mounting material (for example, by mounting material mat separation or adhesive transfer) during repositioning operations that occur in assembly of pollution control devices. Accordingly, aspects of the present invention are particularly applicable to mounting materials having a relatively low degree of structural cohesiveness such as, for example, mounting materials having a maximum tensile strength of less than 200, 100, 75, or even less than 50 kiloPascals (kPa).

The mounting material comprises inorganic fibers that are sufficiently entangled and/or bonded together to form a cohesive fiber web. The fibers may be entangled by a mechanical process (for example, needletacking) and/or bonded together using a binder (for example, organic binder, inorganic binder, or a combination thereof). In some embodiments, the mounting material may also include organic fibers, although typically included in minor amounts, if at all. Typically, the mounting material has sufficient flexibility and resiliency to enable it to be wound around a monolith and used in a pollution control device.

Useful inorganic fibers include for example, fiberglass, ceramic fibers, non-oxide inorganic fibers such as stainless steel fibers or boron fibers, and mixtures thereof.

Useful ceramic fibers include, for example, aluminoborosilicate fibers, aluminosilicate fibers, alumina fibers, heat-treated versions thereof, and mixtures thereof. Examples of suitable aluminoborosilicate fibers include those commercially available under the trade designations "NEXTEL 312 CERAMIC FIBERS", "NEXTEL 440 CERAMIC FIBERS", and "NEXTEL 550 CERAMIC FIBERS" from 3M Company, St. Paul, Minn. Examples of suitable aluminosilicate fibers include those available under the trade designations "FIBERFRAX" 7000M from Unifrax Corp., Niagara Falls, N.Y., "CERAFIBER" from Thermal Ceramics, Augusta, Ga.; and "SNSC Type 1260 D1" from Nippon Steel Chemical Company, Tokyo, Japan. Examples of suitable commercially available alumina fibers include polycrystalline alumina fibers available from Saffil, Widnes, England under the trade designation "SAFFIL". Suitable ceramic fibers are also disclosed in U.S. Pat. Nos. 3,795,524 (Sowman) and 4,047,965 (Karst et al.).

Examples of other suitable inorganic fibers include: quartz fibers, amorphous and crystalline fibers of high silica content, alumina fibers and high alumina fibers, amorphous and crystalline alumina-silica fibers, oxide and non-oxide fibers, metallic fibers, fibers formed by blowing, spinning and pulling from a melt, sol-gel formed fibers, fibers formed from organic precursors, glass fibers, leached glass fibers, and other fibers of a substantially inorganic composition. Suitable inorganic fibers may also comprise a surface coating or a sizing of organic and inorganic material. Suitable inorganic fibers may obviously be used alone or in combination with other suitable inorganic fibers.

Generally speaking, inorganic fibers containing a substantial amount of shot are less expensive than shot-free, or partially cleaned inorganic fibers. However, shot-free inorganic fibers generally provide more resilient articles (for example, webs, sheets, mats), which better maintain holding forces at all temperatures including a return to room temperature. Accordingly, the mounting material may contain less than 75, 50, or even less than 40 percent by weight, or less, of shot based on the total dry weight of the mounting material.

Suitable organic binders for the mounting material are known in the art and include polymers and elastomers in the latex form (for example, natural rubber latexes, styrene-butadiene latexes, butadiene-acrylonitrile latexes, and latexes of acrylate and methacrylate polymers and copolymers). Typically, as is known in the art organic binders are flocculated onto the fibers of the web using a flocculating agent, especially during wet laid manufacturing processes. Suitable inorganic binders are known in the art for such use and include tetrasilicic fluorine mica, in either the water-swelling non-exchanged form or after flocculation as the exchanged salt with a divalent or polyvalent cation, and bentonite.

Optionally, the mounting material may comprise one or more intumescent materials (which may be unexpanded, partially expanded, expanded, or a mixture thereof), typically, depending on the desired end use. For example, for use at temperatures above about 500° C., unexpanded vermiculite materials are suitable since they start to expand at a temperature range of from about 300° C. to about 340° C. This may be useful to fill the expanding gap between an expanding metal housing and a monolith in a catalytic converter. For use at temperatures below about 500° C., such as in diesel monoliths or particulate filters, expandable graphite or a mixture of expandable graphite and unexpanded vermiculite materials may be desired since expandable graphite starts to expand or intumesce at about 210° C. Treated vermiculites are also useful and typically expand at a temperature of about 290° C.

Examples of useful intumescent materials include unexpanded vermiculite flakes or ore, treated unexpanded vermiculite flakes or ore, partially dehydrated vermiculite ore, expandable graphite, mixtures of expandable graphite with treated or untreated unexpanded vermiculite ore, hydrobiotite, water swellable synthetic tetrasilicic fluorine type mica (for example, as described in U.S. Pat. No. 3,001,571 (Hatch)), alkali metal silicate granules (for example, as described in U.S. Pat. No. 4,521,333 (Graham et al.)), processed expandable sodium silicate (for example, insoluble sodium silicate commercially available under the trade designation "EXPANTROL" from 3M Company), and mixtures thereof. An example of a commercially available expandable graphite material is that available under the trade designation "GRAFOIL Grade 338-50" expandable graphite flake, from UCAR Carbon Co., Cleveland, Ohio. Treated unexpanded vermiculite flakes or ore includes unexpanded vermiculite treated by processes such as by being ion exchanged with ion exchange salts such as ammonium dihydrogen phosphate, ammonium nitrate, ammonium chloride, potassium chloride, or other suitable compounds as is known in the art.

Factors to consider in choosing an intumescent sheet material typically include the use temperature and the type of monolith (for example, ceramic monolith or metallic monolith). Suitable intumescent sheet materials typically comprise unexpanded vermiculite ore (commercially available, for example, from W. R. Grace and Co., Cambridge, Mass.), organic binder and/or inorganic binder, ceramic fibers, and filler (for example, clay (for example, kaolin) and hollow ceramic beads or bubbles). For example, U.S. Pat. No. 3,916,057 (Hatch et al.) discloses intumescent sheet material comprising unexpanded vermiculite, inorganic fibrous material, and inorganic binder. U.S. Pat. No. 4,305,992 (Langer et al.) discloses intumescent sheet material comprising ammonium ion-treated vermiculite, inorganic fibrous material, and organic binder. Further, intumescent sheet material is commercially available, for example, from the 3M Company of St. Paul, Minn., under the trade designation "INTERAM MAT MOUNT."

Typically, the mounting material comprises, on a dry weight basis, from 30 to 99.5 percent by weight of the inorganic fibers (for example, from 40 to 98.5 percent by weight, from 50 to 97 percent by weight, or from 60 to 97 percent by weight), from 0.5 to 9 percent by weight of an inorganic and/or organic binder (for example, from 0.5, 1.0, or 1.5 up to 3, 4, 5, 6, 7 or 8 percent by weight), and optionally up to 60 percent by weight of intumescent material, although compositions falling outside this range may also be used. In embodiments wherein intumescent material is not included in the mounting material, the percentage of inorganic fibers on a dry weight basis is typically at least 85 (for example, at least 90, 91, 92, 93, 94, or even at least 95 percent by weight, or more) percent, although lower weight percentages may also be used.

The mounting material may optionally contain one or more inorganic fillers, inorganic binders, organic binders, organic fibers, and mixtures thereof.

Examples of fillers include delaminated vermiculite, hollow glass microspheres, perlite, alumina trihydrate, calcium carbonate, and mixtures thereof. Fillers may be present in the mounting material at levels of up to 10 percent, desirably up to 25 percent, and more desirably up to 50 percent by dry weight of the mounting material.

Examples of inorganic binders include micaceous particles, kaolin clay, bentonite clay, and other clay-like minerals. Inorganic binders may be present in the mounting material at levels up to 5 percent, desirably up to 25 percent, and more desirably up to 50 percent by dry weight of the mounting material.

Optionally, organic fibers (for example, staple fibers or fibrillated fibers) may be included in the mounting material of the present invention, for example, to provide wet strength during processing and dry strength and resiliency to mat and sheet mounting materials prior to canning. However, in general, it is desirable to minimize the content of such fibers as they contribute to objectionable burn off.

Other additives or process aides that may be included in mounting material according to the present invention include defoaming agents, surfactants, dispersants, wetting agents, salts to aid precipitation, fungicides, and bactericides.

The mounting material is typically formulated to have physical properties suitable for in pollution control devices, although it may be formulated with different physical properties if desired.

Typically, the mounting material has a dry basis weight in a range of from 400, 700, 1000, 1500, or even 2000 grams per square meter (gsm) up to 5000, 10000, or 15000 gsm. For example, non-intumescent mounting materials typically have a dry basis weight of from 400 to 2500 gsm, more typically 1000 to 1800 gsm. Intumescent mounting materials typically have a dry basis weight of from 1200 to 15000 gsm, more typically 2400 to 8000 gsm. The mounting material may be made by any suitable technique including; for example, using air laid or wet laid techniques that are well known in the art.

The mounting material and/or the repositionable mounting material may have any tensile strength. Typically, the tensile strength of mounting material and/or the repositionable mounting material at least about 50 kPa, more typically at least about 75 kPa, even more typically at least about 100 kPa.

In one exemplary useful method, a slurry in water (for example, typically greater than 95 percent by weight water) of the inorganic fibers, and an organic polymer, is prepared and combined with a flocculent. Optional ingredients (for example, defoaming agent, intumescent material or filler) are then added (if used) and the slurry is then formed into mounting material by traditional wet-laid non-woven papermaking techniques. Briefly, this process includes mixing the components and pouring the slurry onto a wire mesh or screen to remove most of the water. The formed sheet is then dried to form the mounting material. The mounting material may then be converted to desired forms such as sheets and mats. The process may be carried out in a step-wise, batch, and/or continuous fashion.

When making the slurry, higher density materials such as the optional intumescent material and higher density fillers (if used) may be added to the slurry in a smaller volume mixing vessel at a constant rate just prior to the depositing step. Slurries containing fillers and intumescent materials are agitated sufficiently so to prevent these particles from settling out in the mixing tank prior to pouring the slurry onto the mesh. Such slurries should typically be partially dewatered almost immediately after being deposited on the mesh so to prevent undesirable settling of the higher density particles. Vacuum dewatering of the slurries is desirable. Useful drying methods include wet pressing the dewatered slurries through compression or pressure rollers followed by passing the material through heated rollers and forced hot air drying as is known in the art.

The layer of repositionable pressure-sensitive adhesive is typically prepared from components comprising adhesive microspheres and binder particles. Without wishing to be bound by theory, it is believed that, as applied to the mounting material out of a liquid vehicle, the larger adhesive microspheres are primarily deposited on the outer surface of the mounting material where they are available for adhesive bonding, while the smaller binder particles typically penetrate some distance into the mounting material. The binder particles strengthen the mounting material near the adhesive surface such that it is less prone to damage and/or adhesive transfer during use. On the other hand, depending of the application method of the layer of repositionable pressure-sensitive adhesive and on the ratio of adhesive microspheres to binder particles, the adhesive properties of the layer can become degraded to a point where it is no longer a pressure sensitive adhesive.

Accordingly, adjustment of the composition of the layer of repositionable adhesive (for example, the relative amounts of adhesive microspheres, binder particles, and optional dispersant particles), the particular method of its application, and its application weight will typically affect adhesiveness and repositionability of the repositionable mounting material. In general, these (and other) parameters may be readily adjusted according to routine experimental methods to achieve specific properties for individual mounting materials and intended applications.

The adhesive microspheres and binder particles may be conveniently obtained and used as dispersions in a liquid vehicle. The liquid vehicle typically comprises water and/or volatile organic solvent (for example, a water soluble volatile organic solvent).

The adhesive microspheres are polymeric particles that when the liquid vehicle is removed have pressure-sensitive adhesive properties. The adhesive microspheres may have any particle size distribution as long as at any modes that make up the distribution have a D50 of at least 30 microns. For example, in certain embodiments the mode(s) may have a D50 in a range of from at least 30, 40, 50, or 60 microns up to 80, 100, 150, 200, 300, 400 or even 500 microns, or more. Adhesive microspheres suitable for use in the present invention include those useful for manufacture of repositionable pressure sensitive adhesives. Typically, such adhesive microspheres are made by suspension polymerization.

Dispersions of adhesive microspheres that can be dried to prepare repositionable pressure-sensitive adhesives are well known in the art and include, for example, those made according to procedures described in U.S. Pat. No. 5,571,617 (Cooprider et al.); U.S. Pat. No. 5,714,237 (Cooprider et al); U.S. Pat. No. 5,118,750 (Silver et al); U.S. Pat. No. 5,045,569 (Delgado); U.S. Pat. No. 5,824,748 (Kesti et al); U.S. Pat. No. 4,786,696 (Bohnel); and U.S. Pat. No. 5,756,625 (Crandall et al). Examples of dispersions of adhesive microspheres further include a dispersion of adhesive microspheres marketed under the trade designation "CRAIGSTICK 3991 PLY" by Craig Adhesives and Coatings, Newark, N.J., and a dispersion of adhesive microspheres prepared essentially as described in Example 1 of U.S. Pat. No. 5,714,237 (Cooprider et al.), except that 2-ethylhexyl acrylate is used in place of isooctyl acrylate.

Dispersant particles, typically comprising organic polymers, may optionally be combined with the adhesive microspheres in a liquid vehicle, generally in small amounts, to reduce settling of the adhesive microspheres. For example, the respective total volume ratio of the adhesive microspheres to the dispersant particles may be 95:5 or higher. Suitable dispersant particles include any polymeric stabilizer that effectively provides sufficient stabilization of the adhesive particles and prevents agglomeration within a suspension polymerization process is useful in the present invention. Examples of dispersant particles include salts of polyacrylic acids of greater than 5000 molecular weight average (for example, ammonium, sodium, lithium and potassium salts), carboxy-modified poly(acrylamides), copolymers of acrylic acid and dimethylaminoethyl methacrylate, polymeric quaternary amines, a quaternized poly(N-vinylpyrollidone) copolymer, and cellulosics (including quaternized amine substituted cellulosics and carboxy-modified cellulosics).

The binder particles may have any particle size (for example, a particle size in a range of from 0.01, 0.1, 0.3, 0.5 or 1 micrometer up to 5, 10, or 20 micrometers, or more). Generally useful binder particles include those having a particle size distribution wherein all mode(s) have a D50 of less than one micron. For example, in certain embodiments the mode(s) may have a D50 in a range of from at least 0.01, 0.05, 0.1, 0.2, or 0.3 microns up to 0.4, 0.5, 0.6, even 0.7 microns, or more. Typically, the binder particles are made by emulsion polymerization. Useful binder particles include, for example, polymers and elastomers in the latex form (for example, natural rubber latexes, styrene-butadiene latexes, butadiene-acrylonitrile latexes, polyvinyl acetate latexes, polyvinyl acetate copolymer latexes, vinyl acetate—ethylene copolymers, and latexes of acrylate and methacrylate polymers and copolymers). Examples of commercially available useful binder particles include: an ethyl vinyl acetate polymer available under the trade designation "AIRFLEX 600BP" from Air Products, Allentown, Pa.; an acrylic polymer, available under the trade designation "FLEXCRYL SP-38" from Air Products; an acrylic polymer available under the trade designation "RHOPLEX HA-8" from Rohm and Haas, Philadelphia, Pa.; an acrylic polymer available under the trade designation "CARBOTAC 26146" from Noveon, Cleveland, Ohio; an acrylic polymer available under the trade designation "HYCAR 26410" from Noveon; and a styrene butadiene polymer available under the trade designation "STYROFAN ND-593" from BASF Corp., Florham Park, N.J. In certain embodiments (for example, those including CARBOTAC 26146 and/or FLEXCRYL SP-38 acrylic polymers), the binder particles may comprise a pressure-sensitive adhesive.

The adhesive microspheres and binder particles may be present in any suitable weight ratio, typically in a respective ratio of from at least 15:85, 30:70, or 40:60 up to 60:40, 70:30, or 85:15. Ratios outside these ranges may be useful in some embodiments, but they tend to be either insufficiently tacky to adhere well to a monolith or so tacky that they cannot be removed from a monolith without adhesive transfer or damage to the mounting material.

The layer of repositionable pressure-sensitive adhesive may be prepared by any suitable method. For example, it may be prepared by coating the mounting material with dispersion containing adhesive microspheres and binder particles in a liquid vehicle. Examples of suitable coating methods include roll coating, spraying, dipping, and pad coating. In another exemplary method, the pressure-sensitive microsphere adhesive microspheres and the binder particles may be separately applied (for example, as two dispersions in respective liquid vehicles) to the mounting material, in any sequence.

The layer of repositionable pressure-sensitive adhesive may be of any coating weight sufficient to impart repositionable pressure-sensitive adhesive properties. The layer of repositionable pressure-sensitive adhesive may be continuous or discontinuous (for example, stripes and/or dots), and may cover all or only a portion of one major surface of the mounting material. In certain embodiments, the layer of repositionable pressure-sensitive adhesive covers all or only a portion of opposed major surfaces of the mounting material. In certain embodiments, the layer of repositionable pressure-sensitive adhesive may be used to attach two or more layers of repositionable mounting material together.

The layer of repositionable pressure-sensitive adhesive may optionally contain one or more additives such as, for example, tackifier(s), colorant(s) (for example, dyes and/or pigments), flame retardant(s), and smoke reducing agent(s).

Repositionable mounting material according to the present invention may have any dimension and/or thickness. However, for use in pollution control devices the thickness of the repositionable mounting material, and likewise the mounting material is typically in a range of from 0.1 inch (0.3 cm), 0.15 inch (0.38 cm), or 0.2 inch (0.5 cm) up to 0.3 (0.8 cm), 0.5 (1.3 cm), 0.7 (1.8 cm) or one inch (2.5 cm), or more.

Repositionable mounting material according to the present invention is useful in pollution control devices as mounting material (for example, a mounting mat) for mounting a monolith in a housing and/or for end cone insulation. For example, the repositionable mounting material may be disposed between the monolith and the housing by wrapping the monolith with the repositionable mounting material (with the repositionable pressure-sensitive adhesive layer contacting the monolith) and inserting the wrapped monolith into the housing, or by wrapping the inner end cone housing with the repositionable mounting material and then welding the outer end cone housing to the inner end cone housing.

The repositionable mounting material can be manufactured to any desired size and shape; for example, depending on specific application requirements. For example, automobile catalytic converters typically are smaller than diesel converters and generally require a correspondingly smaller mounting mat. Mounting mats can be stacked so that more than one layer of mat is wrapped around a monolith. Typically, the thickness of each intumescent repositionable mounting material is in the range from about 1.5 mm to about 10 mm, although other thicknesses may be used.

Figure 3:
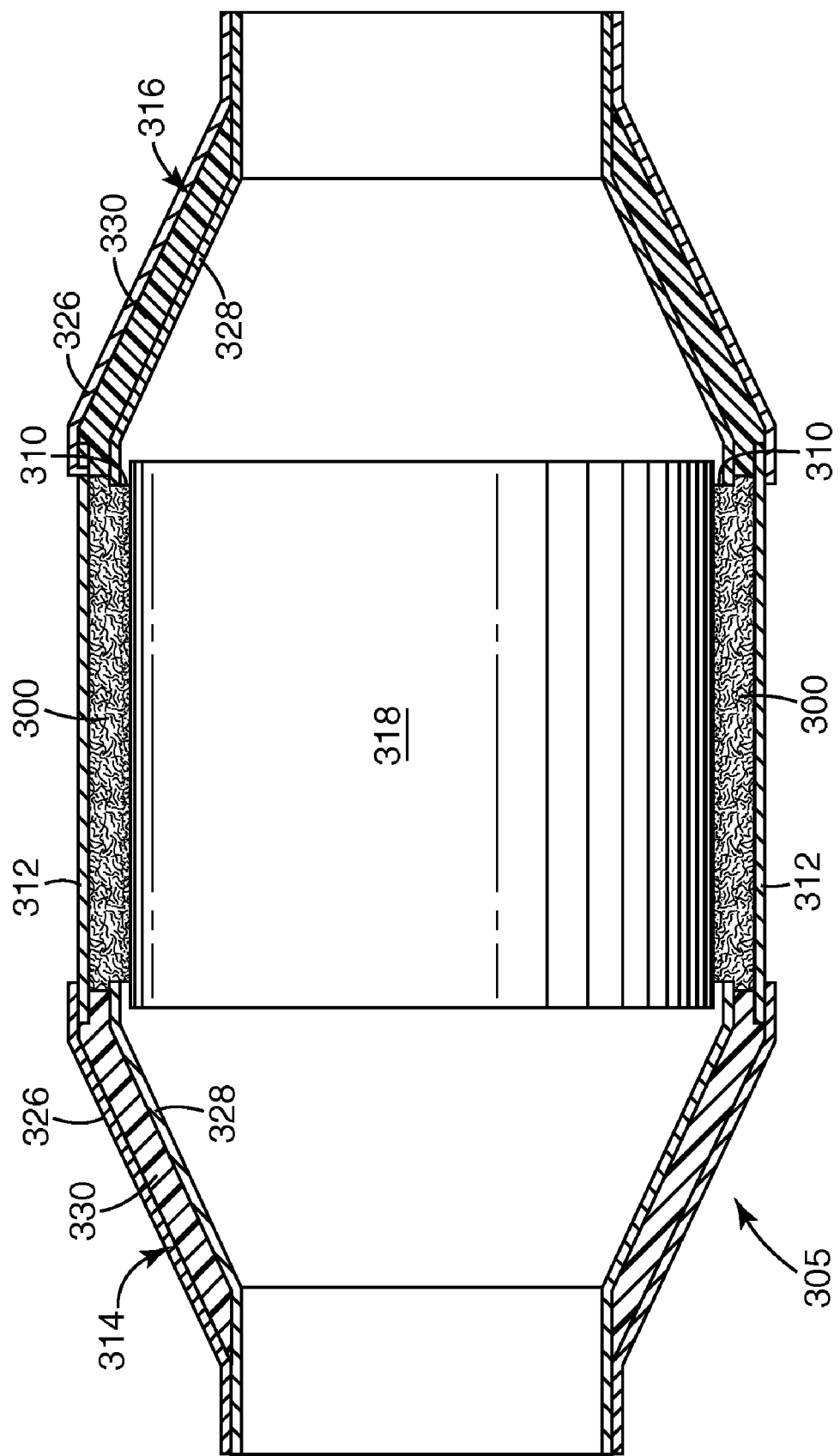
FIG. 3 is a cross-sectional view of an exemplary pollution control device according to one embodiment of the present invention pollution.

Referring now to FIG. 3, exemplary pollution control device 305 includes housing 312 and has a generally conical inlet 314 and outlet 316 (that is, commonly referred to as end cones). Housing 312, which is commonly referred to as a can or a casing, is usually made of metal (for example, stainless steel). Disposed within housing 312 is monolith 318 usually made of a ceramic or metallic material, and which may include a catalyst. Repositionable mounting material 300 surrounds monolith 318 such that the layer of repositionable pressure-sensitive adhesive 310 is releasably adhered to monolith 318. Monolith 318 may be, for example, a catalytic converter element or a diesel particulate filter element.

Inlet 314 and outlet 316 include an inner end cone housing 328 and an outer end cone housing 326. Insulation material 330 is positioned between the inner end cone housing 328 and the outer end cone housing 326. Repositionable mounting material according to the present invention may be used as insulation material 330.

Many examples of pollution control devices are known in the art and include, for example, catalytic converters, end cone sub-assemblies, selective catalytic reduction (SCR) units, and diesel particulate traps and filters. Further details concerning such devices may be found, for example, in U.S. Pat. Nos. 5,882,608 (Sanocki et al.), 6,245,301 (Stroom et al.) and RE 27,747 (Johnson), and in U.S. Publ. Pat. Appln. No. 2006/0154040 A1 (Merry).

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. in the Examples and the rest of the specification are by weight.

Table 1 (below) lists abbreviations and materials used in the Examples that follow:

TABLE 1

| ABBREVIATION | DESCRIPTION |
|---|---|
| SUSP1 | a 40 weight percent solids pressure-sensitive microsphere adhesive obtained under the trade designation "CRAIGSTICK 3991 PLV" from Craig Adhesives and Coatings, Newark, NJ |
| SUSP2 | a 50 weight percent solids pressure-sensitive microsphere adhesive prepared essentially as described in Example 1 of U.S. Pat. No. 5,714,237 (Cooprider et al.), except that 2-ethylhexyl acrylate was used in place of isooctyl acrylate |
| EMUL1 | a 55 weight percent solids ethyl vinyl acetate polymer available under the trade designation "AIRFLEX 600BP" from Air Products, Allentown, PA |
| EMUL2 | a 57 weight percent solids acrylic binder, available under the trade designation "FLEXCRYL SP-38" from Air Products |
| EMUL3 | a 45.5 weight percent solids acrylic binder available under the trade designation "RHOPLEX HA-8" from Rohm and Haas, Philadelphia, PA |
| EMUL4 | a 51 weight percent solids acrylic binder available under the trade designation "CARBOTAC 26146" from Noveon, Cleveland, OH |
| EMUL5 | a 51 weight percent solids acrylic binder available under the trade designation "HYCAR26410" from Noveon, Cleveland, OH |
| EMUL6 | a 51 weight percent solids styrene butadiene binder available under the trade designation "STYROFAN ND-593" from BASF Corp., Florham Park, NJ |
| MAT1 | a non-intumescent ceramic mounting material (1400 grams per square meter, 5.8 mm thickness, maximum tensile strength = 19.7 psi (136 kPa)) available under the trade designation "INTERAM 900HT" from 3M Company, St. Paul, MN |
| MAT2 | an intumescent ceramic mounting material (4070 grams per square meter, 6.1 mm thickness, maximum tensile strength = 51 psi (250 kPa)) available under the trade designation "INTERAM 100" from 3M Company |
| MAT3 | an intumescent ceramic mounting material (5100 grams per square meter, 12.0 mm thickness, maximum tensile strength = 19 psi (130 kPa)) available under the trade designation "INTERAM 700" from 3M Company |
| MAT4 | a non-intumescent ceramic mounting material (1000 grams per square meter, 6.9 mm thickness, maximum tensile strength = 11 psi (75 kPa)) available under the trade designation "INTERAM 1100HT" from 3M Company |

Table 2 (below) lists particle size distribution information for various materials reported in Table 1.

TABLE 2

| MATERIAL | PARTICLE SIZE DISTRIBUTION | D10, micrometers | D50, micrometers | D90, micrometers |
|---|---|---|---|---|
| EMUL1 | bi-modal | | | |
| | mode 1 | 0.162 | 0.284 | 0.807 |
| | mode 2 | 3.34 | 7.35 | 12.8 |
| EMUL2 | mono-modal | 0.327 | 0.463 | 0.612 |
| EMUL3 | mono-modal | 0.061 | 0.101 | 0.171 |
| EMUL4 | mono-modal | 0.137 | 0.181 | 0.236 |
| EMUL5 | mono-modal | 0.147 | 0.219 | 0.323 |
| EMUL6 | mono-modal | 0.144 | 0.188 | 0.242 |
| SUSP1 | bi-modal | | | |
| | mode 1 | 1.098 | 1.55 | 2.45 |
| | mode 2 | 23.07 | 35.1 | 53.7 |
| SUSP2 | bi-modal | | | |
| | mode 1 | 0.191 | 1.09 | 1.889 |
| | mode 2 | 27.75 | 48.94 | 107.6 |

General Procedure for Preparation of Coated Mounting Material:

Specimens of a mounting material (for example, MAT1 through MAT4) were cut to dimensions of 7 inches (20 cm)×12 inches (30 cm).

Dispersions of the pressure-sensitive microsphere adhesive and binder were separately mixed prior to use to ensure homogeneity. The particle dispersions were blended by pouring from the original container into 8-ounce (0.2-liter) glass jars, followed by stirring for one minute with a wooden tongue depressor to give a dryable composition. Each dryable composition was poured into a separate clean aluminum tray. A 1¼-inch (3.2-cm) diameter×4-inch (10-cm) foam paint roller was used to apply the dryable composition to the mounting material. A clean roller was used for each specimen. The foam roller was replenished with fresh dryable composition four times per specimen. After the specimens were coated, they were dried at 100° C. for 15-30 minutes, whereupon the resulting dry adhesive-coated surface was protected with a sheet of silicone-coated release paper. The resultant coated specimens were allowed to equilibrate to room conditions (70° F. (21° C.), 50 percent relative humidity) for at least five days, whereupon they were weighed to determine the adhesive coating weight.

Ceramic Adhesion Test:

A 0.25-inch (0.63-cm) horizontal aluminum shaft was mounted firmly at a distance of 5.5 in (13.75 cm) below and horizontally offset from the lower edge of the upper pneumatic grips of a force measurement device (available under the trade designation "MODEL 100P-12 TEST SYSTEM" available from Test Resources, Shakopee, Minn.).

The specimen to be tested (1 in (2.5 cm)×12 in (30 cm)) was circumferentially wrapped around (at least half way and with layer of repositionable pressure-sensitive adhesive against the monolith) the approximate center of a cordierite thin wall ceramic monolith (3.366×3.15 inch (85.5×80 mm), Cell: 350, Web: 5.5, Comp: EX22, Part number: 833844 7601 1000, available under the trade designation "CELCOR" from Corning, Inc., Corning, N.Y.; 3⅜-inch (8.4 cm) diameter× 3⅛-inch (7.8 cm) length) with a ⅜-inch (0.93 cm) circular hole bored in the center of the circular face) and the specimen was held in place with moderate hand pressure for about 30 seconds.

The aluminum shaft was inserted through the hole in the center of the monolith such that the assembly was firmly mounted directly below the pneumatic grips. The specimen was pneumatically clamped in the upper grips of the force measurement machine.

As tested, the specimen was oriented such that the applied force was tangent to the circumference of the monolith. The force measurement device pulled the coated fibrous mounting material specimen off the ceramic monolith at a rate of 5 in/min minute (12.5 cm/min) for a distance of 4 inches (10 cm). The average peel force, and whether or not adhesive transfer or failure (separation) of the fiber mat, was recorded.

Stainless Steel Adhesion Test:

A one-inch (2.5 cm) by 12-inch (30 cm) strip of 4-mil (0.01 cm) stainless steel (321 anneal stainless steel shim with a bright finish) was bonded with moderate hand pressure to a specimen to be tested (1-inch (2.5 cm) by 12-inch (30 cm) resulting in a one-inch (2.5 cm) overlap (that is, making a 23 inch strip with one end being stainless steel and one end being the support mat). The area of contact was one square inch (6.5 square cm). This construction was placed in the pneumatic clamps of a force measurement device (available under the trade designation "MODEL 100P-12 TEST SYSTEM" available from Test Resources). The specimen was placed in the lower clamp, the stainless steel in the upper clamp. The jaws of the force measurement device were approximately 20 inches (50 cm) apart. The force measurement device pulled the stainless steel strip off the specimen at a rate of five inches per minute (12.5 cm per minute) until the bond fails. The peak force, and whether or not adhesive transfer or failure (separation) of the fiber mat, was recorded.

Polypropylene Adhesion Test:

A one-inch (2.5-cm) by 12-inch (30-cm) piece of 2 mil polypropylene strip was adhered to the adhesive-coated face of a specimen (1 inch (2.5 cm) by 12 inches (30 cm)) to be tested using moderate finger pressure such that 5 inches (13 cm) of overlap was achieved. The remaining 7 inches (17.5 cm) of polypropylene film was held away from the adhesive while the opposite end of the support mat was clamped into the lower jaws of the force measurement device (model 100P-12 Test System available from Test Resources, Shakopee, Minn.). The free of the polypropylene strip was carefully placed and clamped into the upper jaw of the force measurement device. The Jaws of the force measurement device were approximately 12 inches (30 cm) apart. The force measurement device was configured to pull the polypropylene film off the adhesive coated support mat at a 180° peel angle and at a rate of 5 in/min (12.5 cm/min) for a distance of 4 inches (10 cm). The average peel force, and whether or not adhesive transfer or failure (separation) of the fiber mat, was recorded.

In Tables 2 through 4: * indicates mounting material delamination; and ND means not determined.

Examples 1 to 14 and Comparative Examples A to L

Coated mounting materials were prepared according to the General Procedure for Preparation of Adhesive-Coated Mounting Material. Table 3 reports results of evaluation of the adhesive-coated mounting materials by test methods described hereinabove. In Table 3 (below), an asterisk (*) indicates failure of the mounting material; and the term "ND" means not determined.

TABLE 3

| EXAMPLE | MAT | ADHESIVE DISPERSION | BINDER DISPERSION | WEIGHT RATIO OF ADHESIVE DISPERSION TO BINDER DISPERSION | DRY COAT WEIGHT OF LAYER OF REPOSITIONABLE PRESSURE-SENSITIVE ADHESIVE, grams/meter$^2$ | CERAMIC ADHESION TEST, grams | STAINLESS STEEL ADHESION TEST, grams | POLY-PROPYLENE ADHESION TEST, grams |
|---|---|---|---|---|---|---|---|---|
| Comparative Example A | MAT2 | SUSP2 | NONE | 100:0 | 27 | 267* | 921* | 62* |
| 1 | MAT2 | SUSP2 | EMUL4 | 1:1 | 109 | 122 | 909 | 296 |
| 2 | MAT2 | SUSP2 | EMUL2 | 1:1 | 124 | 177 | 917 | 205 |
| 3 | MAT2 | SUSP2 | EMUL1 | 1:1 | 117 | 219 | 915 | 314 |
| 4 | MAT2 | SUSP2 | EMUL3 | 1:1 | 108 | 88 | 902 | 82 |
| Comparative Example B | MAT2 | SUSP1 | NONE | 100:0 | 80 | 334* | 900* | 174* |
| 5 | MAT2 | SUSP1 | EMUL4 | 1:1 | 90 | 86 | 917 | 144 |
| 6 | MAT2 | SUSP1 | EMUL2 | 1:1 | 105 | 144 | 919 | 97 |
| 7 | MAT2 | SUSP1 | EMUL1 | 1:1 | 107 | 192 | 909 | 254 |

TABLE 3-continued

| EXAMPLE | MAT | ADHESIVE DISPERSION | BINDER DISPERSION | WEIGHT RATIO OF ADHESIVE DISPERSION TO BINDER DISPERSION | DRY COAT WEIGHT OF LAYER OF REPOSITIONABLE PRESSURE-SENSITIVE ADHESIVE, grams/meter$^2$ | CERAMIC ADHESION TEST, grams | STAINLESS STEEL ADHESION TEST, grams | POLY-PROPYLENE ADHESION TEST, grams |
|---|---|---|---|---|---|---|---|---|
| 8 | MAT2 | SUSP1 | EMUL3 | 1:1 | 109 | 83 | 902 | 224 |
| Comparative Example C | MAT2 | NONE | EMUL4 | 1:1 | 82 | 0, 0 | 9 | 15 |
| Comparative Example D | MAT2 | NONE | EMUL2 | 0:100 | 96 | 0, 0 | 12 | 21 |
| Comparative Example E | MAT2 | NONE | EMUL1 | 0:100 | 115 | 0, 0 | 21 | 22 |
| Comparative Example F | MAT2 | NONE | EMUL3 | 0:100 | 121 | 0, 0 | 3 | 13 |
| Comparative Example G | MAT1 | SUSP2 | NONE | 100:0 | 34 | 180* | ND | 168* |
| 9 | MAT1 | SUSP2 | EMUL1 | 1:1 | 97 | 325 | ND | 218 |
| 10 | MAT1 | SUSP2 | EMUL2 | 1:1 | 104 | 285 | ND | 260 |
| Comparative Example H | MAT1 | SUSP1 | NONE | 1:1 | 83 | 93* | ND | 196* |
| 11 | MAT1 | SUSP1 | EMUL1 | 1:1 | 72 | 79 | ND | 82 |
| 12 | MAT1 | SUSP1 | EMUL2 | 1:1 | 48 | 100 | ND | 88 |
| Comparative Example I | MAT1 | NONE | EMUL1 | 0:100 | 70 | 0, 0 | ND | 0 0 |
| Comparative Example J | MAT1 | NONE | EMUL2 | 0:100 | 126 | 0, 0 | ND | 0 0 |
| 13 | MAT1 | SUSP2 | EMUL6 | 1:1 | 64 | 64 | ND | ND |
| Comparative Example K | MAT1 | NONE | EMUL6 | 0:100 | 74 | 0, 0 | ND | ND |
| Comparative Example L | MAT1 | NONE | EMUL5 | 0:100 | 105 | 0, 0 | ND | ND |
| 14 | MAT1 | SUSP2 | EMUL5 | 1:1 | 100 | 80, 176 | ND | ND |

Examples 15 to 42 and Comparative Examples M to X

Adhesive-coated mounting materials were prepared according to the method described in the General Procedure for Preparation of Adhesive-Coated Mounting Material (hereinabove). Table 4 reports results of evaluation of the adhesive-coated mounting materials by test methods described hereinabove. In Table 4 (below), an asterisk indicates failure of the mounting material.

TABLE 4

| EXAMPLE | MAT | ADHESIVE DISPERSION | BINDER DISPERSION | WEIGHT RATIO OF ADHESIVE DISPERSION TO BINDER DISPERSION | DRY COAT WEIGHT OF LAYER OF REPOSITIONABLE PRESSURE-SENSITIVE ADHESIVE, grams/meter$^2$ | CERAMIC ADHESION TEST, grams |
|---|---|---|---|---|---|---|
| Comparative Example M | MAT1 | SUSP2 | EMUL5 | 0:100 | 123 | 0 |
| Comparative Example N | MAT1 | SUSP2 | EMUL5 | 5:95 | 103 | 0 |
| 15 | MAT1 | SUSP2 | EMUL5 | 10:90 | 126 | 8 |
| 16 | MAT1 | SUSP2 | EMUL5 | 20:80 | 107 | 32 |
| 17 | MAT1 | SUSP2 | EMUL5 | 30:70 | 107 | 42 |
| 18 | MAT1 | SUSP2 | EMUL5 | 40:60 | 142 | 69 |
| 19 | MAT1 | SUSP2 | EMUL5 | 50:50 | 112 | 80 |
| 20 | MAT1 | SUSP2 | EMUL5 | 60:40 | 103 | 75 |
| 21 | MAT1 | SUSP2 | EMUL5 | 70:30 | 96 | 115 |
| Comparative Example O | MAT1 | SUSP2 | EMUL5 | 80:20 | 53 | 124* |
| Comparative Example P | MAT1 | SUSP2 | EMUL5 | 90:10 | 56 | 117* |
| Comparative Example Q | MAT1 | SUSP2 | EMUL5 | 95:5 | 50 | 118* |
| Comparative Example R | MAT1 | SUSP2 | EMUL5 | 100:0 | 67 | 152* |
| 22 | MAT4 | SUSP2 | EMUL5 | 10:90 | 161 | 29 |
| 23 | MAT4 | SUSP2 | EMUL5 | 20:80 | 148 | 65 |
| 24 | MAT4 | SUSP2 | EMUL5 | 30:70 | 133 | 68 |
| 25 | MAT4 | SUSP2 | EMUL5 | 40:60 | 133 | 111 |
| 26 | MAT4 | SUSP2 | EMUL5 | 50:50 | 171 | 117 |

TABLE 4-continued

| EXAMPLE | MAT | ADHESIVE DISPERSION | BINDER DISPERSION | WEIGHT RATIO OF ADHESIVE DISPERSION TO BINDER DISPERSION | DRY COAT WEIGHT OF LAYER OF REPOSITIONABLE PRESSURE-SENSITIVE ADHESIVE, grams/meter$^2$ | CERAMIC ADHESION TEST, grams |
|---|---|---|---|---|---|---|
| 27 | MAT4 | SUSP2 | EMUL5 | 60:40 | 171 | 148 |
| 28 | MAT4 | SUSP2 | EMUL5 | 70:30 | 184 | 205 |
| Comparative Example S | MAT4 | SUSP2 | EMUL5 | 80:20 | 121 | 72* |
| Comparative Example T | MAT4 | SUSP2 | EMUL5 | 90:10 | 134 | 38* |
| Comparative Example U | MAT3 | SUSP2 | EMUL5 | 10:90 | 145 | 0 |
| 29 | MAT3 | SUSP2 | EMUL5 | 20:80 | 154 | 39 |
| 30 | MAT3 | SUSP2 | EMUL5 | 30:70 | 154 | 47 |
| 31 | MAT3 | SUSP2 | EMUL5 | 40:60 | 145 | 52 |
| 32 | MAT3 | SUSP2 | EMUL5 | 50:50 | 171 | 102 |
| 33 | MAT3 | SUSP2 | EMUL5 | 60:40 | 165 | 135 |
| 34 | MAT3 | SUSP2 | EMUL5 | 70:30 | 175 | 135 |
| 35 | MAT3 | SUSP2 | EMUL5 | 80:20 | 194 | 174 |
| Comparative Example V | MAT3 | SUSP2 | EMUL5 | 90:10 | 208 | 233* |
| Comparative Example W | MAT2 | SUSP2 | EMUL5 | 10:90 | 168 | 0 |
| 36 | MAT2 | SUSP2 | EMUL5 | 20:80 | 232 | 35 |
| 37 | MAT2 | SUSP2 | EMUL5 | 30:70 | 193 | 51 |
| 38 | MAT2 | SUSP2 | EMUL5 | 40:60 | 167 | 68 |
| 39 | MAT2 | SUSP2 | EMUL5 | 50:50 | 165 | 74 |
| 40 | MAT2 | SUSP2 | EMUL5 | 60:40 | 182 | 153 |
| 41 | MAT2 | SUSP2 | EMUL5 | 70:30 | 178 | 111 |
| 42 | MAT2 | SUSP2 | EMUL5 | 80:20 | 159 | 179 |
| Comparative Example X | MAT2 | SUSP2 | EMUL5 | 90:10 | 173 | 232* |

Examples 43 to 46 and Comparative Examples Y to AB

Adhesive-coated mounting materials were prepared according to the method described in General Procedure for Preparation of Adhesive-Coated Mounting Material (hereinabove), except that additional water was added to the dryable composition in amounts as indicated. Table 5 reports results of evaluation of the adhesive-coated mounting materials by test methods described hereinabove. In Table 5 (below), an asterisk indicates failure of the mounting material.

TABLE 5

| EXAMPLE | MAT | ADHESIVE DISPERSION | BINDER DISPERSION | WEIGHT RATIO OF ADHESIVE DISPERSION TO BINDER DISPERSION | PERCENT WATER | DRY COAT WEIGHT OF LAYER OF REPOSITIONABLE PRESSURE-SENSITIVE ADHESIVE, grams/meter$^2$ | CERAMIC ADHESION TEST, grams |
|---|---|---|---|---|---|---|---|
| Comparative Example Y | MAT1 | SUSP2 | none | 100:0 | 0 | 67 | 152* |
| Comparative Example Z | MAT1 | SUSP2 | none | 100:0 | 25 | 65 | 179* |
| Comparative Example AA | MAT1 | SUSP2 | none | 100:0 | 50 | 29 | 165* |
| Comparative Example AB | MAT1 | SUSP2 | none | 100:0 | 75 | 14 | 121* |
| 43 | MAT1 | SUSP2 | EMUL5 | 50:50 | 0 | 112 | 80 |
| 44 | MAT1 | SUSP2 | EMUL5 | 50:50 | 25 | 63 | 76 |
| 45 | MAT1 | SUSP2 | EMUL5 | 50:50 | 50 | 36 | 40 |
| 46 | MAT1 | SUSP2 | EMUL5 | 50:50 | 75 | 7 | 45 |

Examples 47-49

Adhesive-coated mounting materials were prepared according to the method described in General Procedure for Preparation of Adhesive-Coated Mounting Material (hereinabove), except that in Examples 47-48 the dispersion of adhesive microspheres and the dispersion of binder particles were applied in separate steps as reported in Table 6 with drying at 100° C. for 15-30 minutes for each applied dispersion. Table 6 (below), also reports results of evaluation of the adhesive-coated mounting materials.

TABLE 6

| EXAMPLE | MAT | FIRST APPLIED DISPERSION | COAT WEIGHT OF FIRST APPLIED DISPERSION, grams/meter² | SECOND APPLIED DISPERSION | COAT WEIGHT OF SECOND APPLIED DISPERSION, grams/meter² | CERAMIC ADHESION TEST, grams | MAT FAILURE, yes/no |
|---|---|---|---|---|---|---|---|
| 48 | MAT2 | EMUL5 | 68 | SUSP2 | 104 | 75 | no |
| 49 | MAT2 | SUSP2 | 68 | EMUL5 | 118 | 29 | no |
| 50 | MAT2 | 1:1 mixture by weight of EMUL5 and SUSP2 | 170 | none | not applicable | 59 | no |

Various modifications and alterations of this invention may be made by those skilled in the art without departing from the scope and spirit of this invention, and it should be understood that this invention is not to be unduly limited to the illustrative embodiments set forth herein.

What is claimed is:

1. A repositionable mounting material comprising:
a mounting material having first and second opposed major surfaces and comprising inorganic fibers; and
a layer of repositionable pressure-sensitive adhesive inwardly disposed along at least a portion of the first major surface, wherein the layer of repositionable pressure-sensitive adhesive comprises:
adhesive microspheres having a first particle size distribution with at least one first mode, each of which has a D50 of at least 30 micrometers; and
binder particles, wherein the binder particles have a second particle size distribution with at least one second mode, each of which has a D50 that is less than 10 micrometers, and wherein at least one of the at least one second modes has a D50 below one micrometer,
wherein the repositionable mounting material is repositionably adherable to a monolith adapted for use in a pollution control device, and wherein a reference mounting material, prepared identically to the repositionable mounting material, except without the binder particles, is not repositionably adherable to the monolith.

2. The repositionable mounting material of claim 1, wherein the mounting material has a maximum tensile strength that is less than 400 kPa.

3. The repositionable mounting material of claim 1, wherein the layer of repositionable pressure-sensitive adhesive further comprises dispersant particles having a third size distribution with at least one third mode, each of which has a D50 of greater than one micrometer and less than 30 micrometers, and wherein on a volume basis, the adhesive microspheres and dispersant particles are present in a respective ratio of at least 95:5.

4. The repositionable mounting material of claim 1, wherein, on a weight basis, the adhesive microspheres comprise from 15 to 80 percent of the total weight of the adhesive microspheres, binder particles, and dispersant particles combined.

5. The repositionable mounting material of claim 1, wherein at least a portion of the inorganic fibers are bonded together by a binder.

6. The repositionable mounting material of claim 1, wherein the binder comprises organic material.

7. The repositionable mounting material of claim 1, wherein the mounting material has a dry basis weight of from 0.4 to 15 kilograms per square meter.

8. The repositionable mounting material of claim 1, wherein the mounting material further comprises an unexpanded intumescent material.

9. The repositionable mounting material of claim 8, wherein the unexpanded intumescent material comprises vermiculite, graphite, or a combination thereof.

10. The repositionable mounting material of claim 1, wherein the inorganic fibers comprise ceramic fibers.

11. The repositionable mounting material of claim 1, further comprising a liner releasably adhered to the layer of repositionable pressure-sensitive adhesive.

12. The repositionable mounting material of claim 1, wherein each of the at least one first modes of the first particle size distribution has a D50 of at least 45 micrometers.

13. The repositionable mounting material of claim 1, wherein each of the at least one second modes of the second particle size distribution has a D50 in a range of from 0.05 to 0.3 micrometer.

14. The repositionable mounting material of claim 1, wherein, on average, the binder particles are situated father from to the major surface than the adhesive microspheres.

15. The repositionable mounting material of claim 1, adapted for use in a pollution control device.

16. A pollution control device comprising:
a housing;
a pollution control element disposed within the housing; and
the repositionable mounting material of claim 1 disposed adjacent to, or within, the housing.

17. The pollution control device of claim 16, wherein the mounting material is disposed between the pollution control element and the housing.

18. A method of making a pollution control device, the method comprising:
disposing the repositionable mounting material of claim 1 adjacent to, or within, a housing having a pollution control element disposed within the housing.

19. The method of claim 18, wherein the repositionable mounting material is disposed between the pollution control element and the housing.

20. A method of making a repositionable mounting material, the method comprising:
providing a mounting material having first and second major surfaces and comprising bonded inorganic fibers; and
applying a dryable composition to at least a portion of the major surface of the mounting material, wherein the dryable composition comprises:
adhesive microspheres having a first particle size distribution with at least one first mode, each of which has a D50 of at least 30 micrometers; and
binder particles, wherein the binder particles have a second particle size distribution with at least one second mode, each of which has a D50 that is less than 10 micrometers, and wherein at least one of the at least one second modes has a D50 below one micrometer; and at least partially drying the dryable composition to provide a layer of repositionable pressure-sensitive adhesive inwardly disposed along at least a portion of the first major surface, wherein the repositionable mounting material is repositionably adherable to a monolith adapted for use in a pollution control device, and wherein a reference mounting material, prepared identically to the repositionable mounting material, except without the hinder particles, is not repositionably adherable to the monolith.

21. The method of claim 20, wherein the dryable composition further comprises dispersant particles having a third size distribution with at least one mode, each of which has a D50 of greater than one micrometer and less than 30 micrometers, and wherein on a volume basis, the adhesive microspheres and dispersant particles are present in a respective ratio of at least 95:5.

22. The method of claim 21, wherein, on a weight basis, the adhesive microspheres comprise from 15 to 80 percent of the total weight of the adhesive microspheres, hinder particles, and dispersant particles combined.

23. A method of making a repositionable mounting material, the method comprising:
providing a mounting material having a major surface and comprising bonded inorganic fibers; and
applying a first dryable composition to at least a portion of the major surface of the mounting material, wherein the first dryable composition comprises adhesive microspheres having a first particle size distribution with at least one mode, each of which has a D50 of at least 30 micrometers;
applying a second dryable composition comprising binder particles to at least a portion of the major surface of the mounting material; and
at least partially drying the first and second dryable compositions to provide a layer of repositionable pressure-sensitive adhesive inwardly disposed along at least a portion of the first major surface, wherein the repositionable mounting material is repositionably adherable to a monolith adapted for use in a pollution control device.

24. The method of claim 23, wherein the second dryable composition is applied to at least a portion of the first major surface before the first dryable composition.

25. The method of claim 23, wherein the first dryable composition further comprises dispersant particles having a third size distribution with at least one mode, each of which has a D50 of greater than one micrometer and less than 30 micrometers, and wherein on a volume basis, the adhesive microspheres and dispersant particles are present in a respective ratio of at least 95:5.

26. The method of claim 25, wherein, on a weight basis, the adhesive microspheres comprise from 15 to 80 percent of the total weight of the adhesive microspheres, binder particles, and dispersant particles combined.

27. The method of claim 23, wherein the mounting material has a maximum tensile strength that is less than 400 kPa.

28. The method of claim 23, wherein the mounting material has a dry basis weight of from 0.4 to 15 kilograms per square meter.

29. The method of claim 23, wherein at least a portion of the inorganic fibers are bonded together by a binder.

30. The method of claim 23, wherein the binder comprises organic material.

31. The method of claim 23, wherein the mounting material further comprises an unexpanded intumescent material.

32. The method of claim 31, wherein the unexpanded intumescent material comprises vermiculite, graphite, or a combination thereof.

33. The method of claim 23, wherein the inorganic fibers comprise ceramic fibers.

34. The method of claim 23, further comprising releasably adhering a liner to the layer of repositionable pressure-sensitive adhesive.

35. The method of claim 23, wherein each of the at least one first modes of the first particle size distribution has a D50 of at least 45 micrometers.

36. The method of claim 23, wherein each of the at least one second modes of the second particle size distribution has a D50 in a range of from 0.05 to 0.3 micrometer.

37. The method of claim 23, wherein, on average, the binder particles are situated further from the major surface than the adhesive microspheres.

38. The method of claim 23, further comprising adapting the repositionable mounting material for use in a pollution control device.

* * * * *

UNITED STATES PATENT AND TRADEMARK OFFICE
CERTIFICATE OF CORRECTION

PATENT NO. : 8,178,052 B2
APPLICATION NO. : 12/663613
DATED : May 15, 2012
INVENTOR(S) : Peter T Dietz Page 1 of 1

It is certified that error appears in the above-identified patent and that said Letters Patent is hereby corrected as shown below:

Column 4
Line 10, delete "father" and insert -- farther --, therefor.

Column 9
Line 49, delete "PLY" and insert -- PLV --, therefor.

Column 10
Line 2, delete "poly(N-vinylpyrollidone)" and insert -- (N-vinylpyrrolidone --, therefor.

Column 20
Line 30, In Claim 14, delete "father" and insert -- farther --, therefor.

Column 21
Line 9, In Claim 20, delete "hinder" and insert -- binder --, therefor.

Column 21
Line 20 (Approx.), In Claim 22, delete "hinder" and insert -- binder --, therefor.

Signed and Sealed this
Twenty-eighth Day of August, 2012

David J. Kappos
*Director of the United States Patent and Trademark Office*